United States Patent
Hernandez Orozco et al.

(10) Patent No.: US 11,182,305 B1
(45) Date of Patent: Nov. 23, 2021

(54) SYSTEM FOR REDUCING COMPUTATIONS PERFORMED FOR ITERATIVE REQUESTS

(71) Applicant: AMAZON TECHNOLOGIES, INC., Seattle, WA (US)

(72) Inventors: Miguel Angel Hernandez Orozco, Kirkland, WA (US); Kevin W. Carpenter, Auburn, WA (US); Juan Carlos Hernandez Munuera, Seattle, WA (US); David De, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 136 days.

(21) Appl. No.: 16/588,119

(22) Filed: Sep. 30, 2019

(51) Int. Cl.
*G06F 12/121* (2016.01)

(52) U.S. Cl.
CPC .... *G06F 12/121* (2013.01); *G06F 2212/1044* (2013.01)

(58) Field of Classification Search
None
See application file for complete search history.

(56) References Cited

U.S. PATENT DOCUMENTS

| 9,197,505 B1* | 11/2015 | Hill ................. H04L 67/303 |
| 2014/0149533 A1* | 5/2014 | Bergman ........... H04L 67/2842 709/213 |
| 2014/0173752 A1* | 6/2014 | Boelter ................. H04L 67/16 726/28 |

\* cited by examiner

*Primary Examiner* — Michael Alsip
(74) *Attorney, Agent, or Firm* — Lindauer Law, PLLC

(57) ABSTRACT

To reduce the computational resources used to generate a response, certain inputs from a first request and corresponding outputs are stored in a data structure that is returned to a client device concurrent with a response. When a subsequent request is received, if an input of the subsequent request matches an input stored in the data structure, the output that corresponds to that input is used in a response rather that recomputing the output. For inputs that do not match an input in the data structure, an output is computed and included in a response. The data structure is then returned to the client device concurrent with the subsequent response. Outputs in the data structure may be periodically validated, or may be associated with an expiration time, to ensure that the data structure includes current and valid data.

20 Claims, 7 Drawing Sheets

SYSTEM FOR REDUCING COMPUTATIONS PERFORMED FOR ITERATIVE REQUESTS

BACKGROUND

In some cases, a user or a service may provide a series of similar requests to a server or other type of computing device. For example, a series of iterative requests may be provided to a server associated with a database in which a portion of the inputs of each request are identical, while other inputs are changed. Individually processing each request to determine a response may result in the performance of repetitive or redundant database calls or other types of computations, which may consume a significant quantity of time and computational resources.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
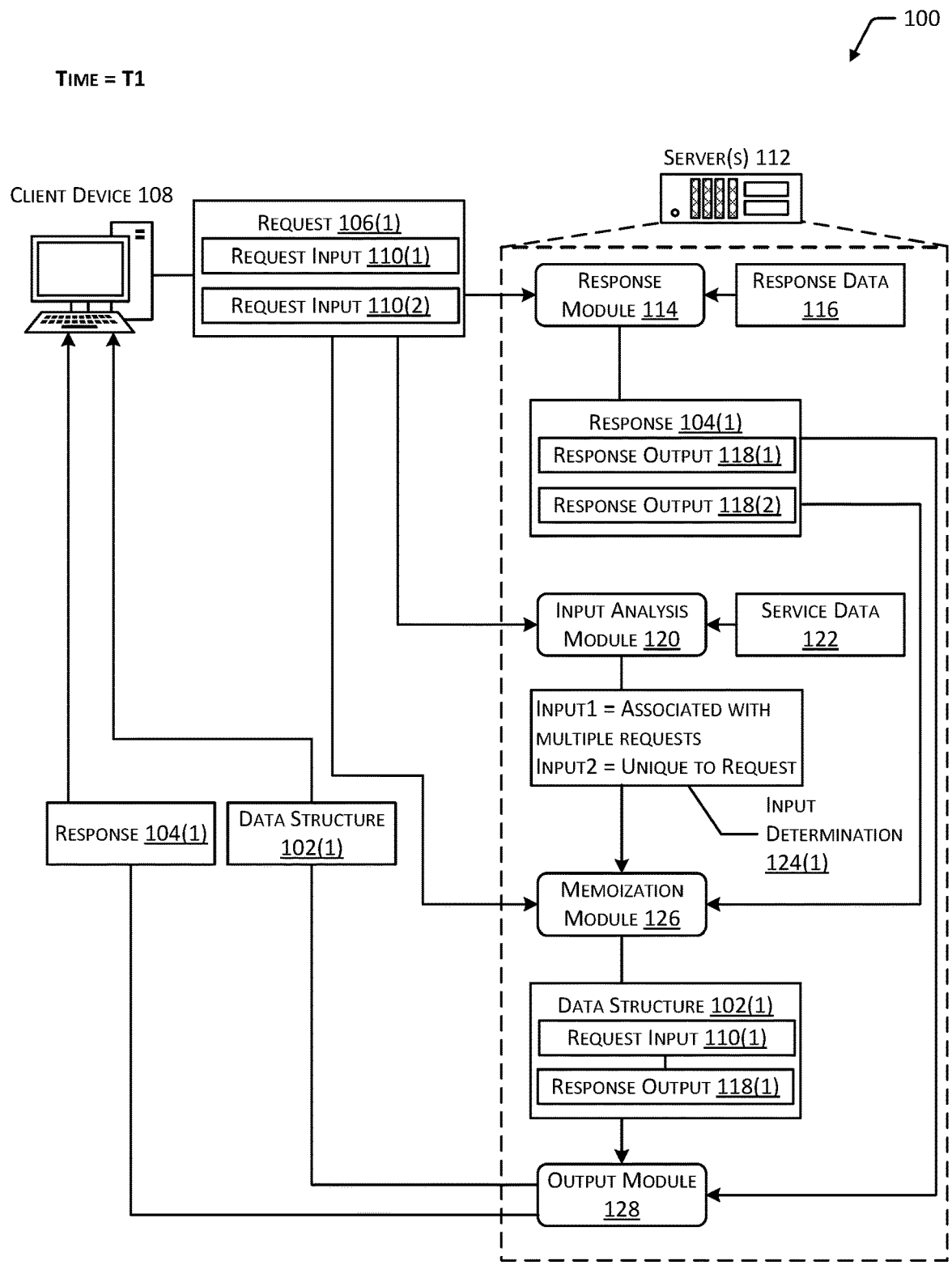
FIG. 1A depicts an implementation of a system at a first time, in which the system generates a data structure and a response to be provided in response to a first request received from a client device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

In some cases, to accomplish a particular task or determine particular information, a series of similar requests may be provided to a server or other type of computing device. For example, a user attempting to determine an appropriate price for an item available for purchase may provide a series of iterative requests to a server associated with a database. Each request may include certain inputs that are common to all of the requests, such as identifiers associated with the item, the user, and so forth. Each request may also include inputs that differ from those of other requests, such as a prospective price for the item. For each input of a request, an Application Programming Interface (API) or other type of service or interface executing on the device that receives the request may determine an output, such as by accessing data in a database or performing another type of computation. When a large number of similar requests are received, a significant amount of time and computational resources may be used to generate a response to each request. In some cases, generation of each response may include performing repetitive, redundant computational tasks. For example, if certain inputs of multiple requests are identical, and the outputs generated in response to those inputs are identical, generation of multiple responses may include the repeated performance of identical computational tasks.

Described in this disclosure are techniques for reducing the amount of computational resources used to process similar requests received from a computing device or group of computing devices. A first request that includes multiple inputs may be received. Certain inputs of the request may be associated with multiple requests, while other inputs may be unique to the first request. Data associated with the request, the computing device providing the request, a user account associated with the request, a service executing on the computing device, and so forth may be used to determine the particular inputs that are associated with multiple requests. For example, particular inputs may be likely to be reused (e.g., identical) across multiple requests depending on the nature of the request, the service providing the request, and so forth. Continuing the example, multiple requests associated with determining the result when a particular price is used for an item may include common inputs, such as inputs associated with item characteristics other than the prospective price, inputs associated with the user or account offering the item for purchase, inputs associated with the regions where the item is available for purchase, and so forth. An output may be determined based on each input of the request. For example, an output may be determined by accessing data in a database that corresponds to a received input and including the corresponding data in a response. Other types of outputs may be generated using other types of computational processes.

A data structure may be generated that includes each input that is determined to be associated with multiple requests, as well as the output that corresponds to each input. A response may also be generated that includes the outputs determined for each input of the request, which may include the inputs that were included in the data structure as well as other inputs of the request. The response and the data structure may then both be provided to the computing device that provided the request.

When a subsequent request is received from the computing device, the computing device may also provide the data structure. The inputs included in the subsequent request may be compared to the inputs stored in the data structure. For each input of the request that matches an input of the data structure, the corresponding output from the data structure may be included in a response without redetermining the output using a database call or other computational process. For each input of the request that does not match an input of the data structure, an output may be determined using a computational process. The response may then be provided to the computing device. The data structure may also be provided to the computing device concurrent with the response. Use of the outputs stored in the data structure in place of recomputing a previously-determined output may reduce the time and computational resources used to generate a response. Additionally, providing the data structure to the requesting computing device with each response may conserve data storage associated with the server or other device associated with performing the computational processes and generating responses. In some implementations, the data structure may be encrypted or provided with one or more security features to reduce the likelihood that a user will modify the data structure prior to providing a subsequent request. Security features may limit access to the data structure or to particular inputs and outputs stored in the data structure by the requesting computing device. For example, the data structure may be subjected to a hash function, and the hashed data structure may be verified when it is received at a subsequent time from a requesting device. As another example, the data structure may be encrypted or provided with other features that limit access or prevent modification to data within the data structure by the requesting computing device. In cases where a data structure received from the requesting computing device is determined to differ from a data structure that was previously provided to the computing device, the received data structure may be disregarded. In such a case, newly-computed outputs may be used to generate a response and a replacement data structure to be provided to the computing device.

In some implementations, the received data structure may be modified prior to providing the data structure to the requesting computing device. For example, the request may include an input that corresponds to one of the inputs in the data structure, but the input of the request does not match the corresponding input of the data structure. In such a case, a new output may be computed based on the mismatched input of the request without using the output included in the data structure. Additionally, the data structure may be modified by adding the mismatched input from the request and the corresponding output, deleting the input that was not matched by the request and the corresponding output, or both adding and deleting a set of inputs and outputs. In some implementations, the validity of the outputs in the data structure may be periodically verified, such as by determining an output using one or more inputs of the data structure, then comparing the determined output to the corresponding output included in the data structure. If the determined output differs from the output in the data structure, the output of the data structure may be deleted or replaced. In other cases, the data structure or specific inputs of the data structure may be associated with an expiration time, such as a time to live (TTL) (e.g., a length of time or a count of uses associated with a data structure or a particular input in the data structure). In some implementations, different inputs within the data structure may be associated with different lengths of time or counts of uses.

As one skilled in the art will appreciate in light of this disclosure, certain embodiments may be capable of achieving certain advantages. For example, storing certain inputs and corresponding outputs in a data structure for future use, then using the outputs stored in the data structure rather than recomputing an output for a subsequent request may significantly reduce the time and computational resources used to generate a response. The reduction in time and computational resources used may be especially apparent when a large number of similar requests are received, such as requests associated with an iterative process. Storage of the data structure on the computing device that provides the requests may conserve data storage in the servers or other devices that generate responses. Use of a data structure that associates selected inputs with corresponding outputs may enable a data structure that is received from a requesting device to be easily and efficiently validated by comparing the inputs of the request to those of the data structure. Inaccurate, invalid, or modified data may be readily recognized by this process, enabling an accurate response to be generated in the case of a mismatched input, while also enabling the data structure to be modified to include more current or more accurate data.

FIG. 1A depicts an implementation of a system 100 at a first time T1, in which the system generates a data structure 102(1) and a response 104(1) to be provided in response to a first request 106(1) received from a client device 108. Specifically, the client device 108 is shown providing a request 106(1) that includes multiple inputs, such as a first request input 110(1) and a second request input 110(2) to one or more servers 112. For example, one type of request 106(1) that may be provided may include a request for determination of an output using data stored in one or more databases. The server(s) 112 may be configured to query or perform other types of operations based on the request inputs 110 to determine a response 104(1). Other types of requests 106(1) associated with other types of computational processes, independent of a database, may also be received. The client device 108 may include any type of computing device including, without limitation, a portable computing device such as a laptop computing device, tablet computing device, smartphone, or wearable computing device, a desktop computing device, an automotive computing device, a set top box, a server, and so forth. While FIG. 1A depicts a single client device 108, in other implementations, one or more requests 106(1) may be provided to the server(s) 112 by multiple client devices 108. For example, one or more client devices 108 may execute a service or group of services that may generate and provide requests 106(1) to the server(s) 112. The server(s) 112 may include any number and any type of computing devices including, without limitation, the types of computing devices described with regard to the client device 108.

A response module 114 associated with the server(s) 112 may generate a response 104(1) based on the received request 106(1). In some implementations, the response module 114 may access response data 116 that associates particular request inputs 110 with corresponding response outputs 118. For example, the response data 116 may include a database having fields that correspond to request inputs 110, while the response module 114 may generate response outputs 118 based on the values of the indicated fields. In other cases, the response module 114 may access other types of data from other types of data structures, may perform calculations or other computational operations based on the request inputs 110 and response data 116, and so forth. For example, multiple items of response data 116 may be used to generate a response output 118 that corresponds to a particular request input 110. As such, each request input 110 shown in FIG. 1A may represent a single input or multiple inputs. Similarly, each response output 118 may represent a single output or multiple outputs. Specifically, FIG. 1 depicts the response module 114 generating a response 104(1) that includes a first response output 118(1) based on the first request input 110(1) and a second response output 118(2) based on the second request input 110(2).

An input analysis module 120 associated with the server(s) 112 may determine particular request inputs 110 of the request 106(1) that are associated with multiple requests 106. For example, based on service data 122 that may indicate characteristics of the client device 108, the request 106(1), a service providing the request 106(1), and so forth, particular request inputs 110 that are likely to be reused in multiple requests 106, such as part of an iterative process, may be determined. As such, the input analysis module 120 may determine particular request inputs 110 that are indicated in or determined from the service data 122. In other implementations, the request 106(1) may include data indicative of the client device 108, request 106(1), or service providing the request 106(1), and the input analysis module 120 may determine the particular request inputs 110 associated with multiple requests 106 based on the data included with the request 106(1). The input analysis module 120 may generate an input determination 124(1) indicative of the particular request inputs 110 that are associated with multiple requests 106. In some implementations, the input determination 124(1) may indicate the particular request inputs 110 that are not associated with multiple requests 106 in addition to or instead of indicating the request inputs 110 associated with multiple requests 106. For example, FIG. 1A depicts an input determination 124(1) indicating that the first request input 110(1) is associated with multiple requests 106, while the second request input 110(2) is not associated with multiple requests 106.

A memoization module 126 associated with the server(s) 112 may generate a data structure 102(1) (e.g., a memoization payload) based on the input determination 124(1), the request inputs 110 of the request 106, and the response outputs 118 associated with the response 104. Specifically, based on the input determination 124(1), the data structure 102(1) may include request inputs 110(1) from the request 106(1) that are determined to be associated with multiple requests 106. The data structure 102(1) may also include the response output 118(1) for the determined request input 110(1). An output module 128 associated with the server(s) 112 may provide the response 104(1) and the data structure 102(1) to the client device 108. The response 104(1) and data structure 102(1) may be provided concurrently or asynchronously.

In some implementations, the memoization module 126 or another module associated with the server(s) 112 may associate an expiration time or count of uses with a particular request input 110 or response output 118 in the data structure 102(1), or with the entire data structure 102(1). After the expiration time or count of uses has occurred, the particular request input 110, response output 118, or the data structure 102(1) may cease being used, and a new data structure 102 may be generated when a subsequent request 106 is received.

Figure 1B:
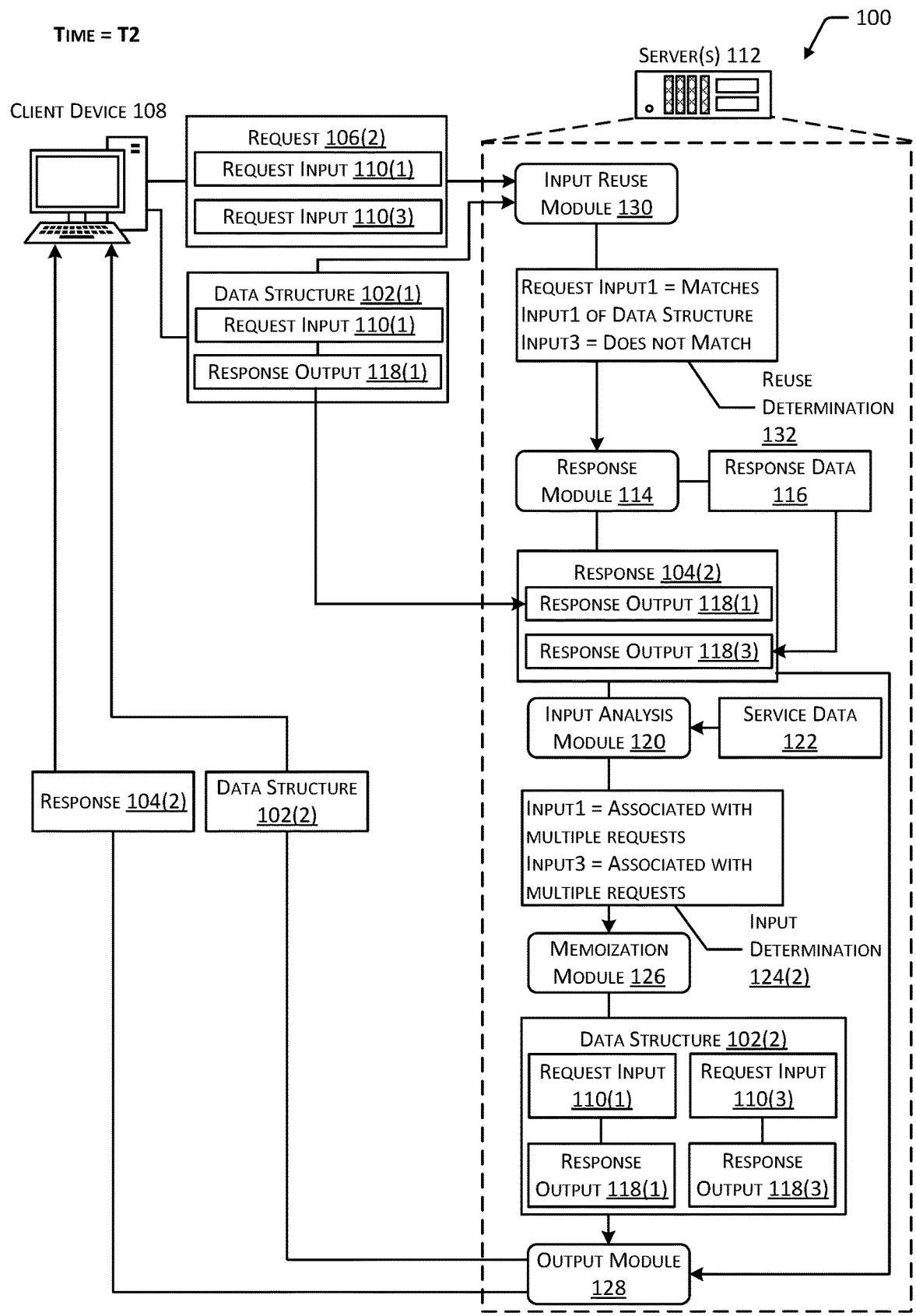
FIG. 1B depicts the system of FIG. 1A at a second time, in which the generated data structure is used to generate a portion of a response to be provide in response to a second request received from the client device.

FIG. 1B depicts the system 100 of FIG. 1A at a second time T2, in which the generated data structure 102(1) is used to generate a portion of a response 104(2) to be provided in response to a second request 106(2) received from the client device 108. As described with regard to FIG. 1A, the client device 108 may provide a request 106(2) that includes one or more request inputs 110 to one or more server(s) 112.

While FIG. 1A depicts the client device 108 providing a first request 106(1) that includes a first request input 110(1) and a second request input 110(2), FIG. 1B depicts the client device 108 providing a second request 106(2) that includes the first request input 110(1) and a third request input 110(3). As such, both the first request 106(1) of FIG. 1A and the second request 106(2) of FIG. 1B include the first request input 110(1), while the second request input 110(2) may be unique to the first request 106(1). For example, the second request input 110(2) and third request input 110(3) may include alternate values for an identical or similar type of request input 110. As described previously, multiple requests 106 provided by the client device 108 may include certain request inputs 110 that are common to the requests 106, such as the first request input 110(1), and other request inputs 110 that are not common to multiple requests 106, such as the second request input 110(2) shown in FIG. 1A.

In addition to providing the request 106(2), the client device 108 may provide the data structure 102(1) that was previously generated and sent to the client device 108. Storage of the data structure 102(1) in association with the client device 108 may prevent consuming data storage associated with the server(s) 112. An input reuse module 130 associated with the server(s) 112 may determine portions of the data structure 102(1) that may be used to generate a response 104(2) without accessing a database or other source of response data 116 or performing computational processes to generate response outputs 118. For example, the input reuse module 130 may determine correspondence between the request inputs 110 stored in the data structure 102(1) and the request inputs 110 of the received request 106(2). Continuing the example, FIG. 1B depicts the second response 106(2) including the first request input 110(1), which matches the first request input 110(1) of the data structure 102(1). Based on this correspondence, the input reuse module 130 may generate a reuse determination 132 indicating that the first request input 110(1) of the request 106(2) matches the first request input 110(1) of the data structure 102(1). In some implementations, the reuse determination 132 may also indicate particular request inputs 110 of the request 106(2) that do not match request inputs 110 of the data structure 102(1), such as the third request input 110(3) of the request 106(2).

Based on the reuse determination 132, the response module 114 may generate a response 104(2) to the second request 106(2) that includes the first response output 118(1) from the data structure 102(1). Because the first request input 110(1) of the request 106(2) matches the first request input 110(1) of the data structure 102(1), the first response output 118(1) that is stored in association with the first request input 110(1) in the data structure 102(1) may be used in the response 104(2) without recomputing the response output 118(1) based on the request input 110(1), such as by accessing the response data 116. Use of the response output 118(1) stored in the data structure 102(1) may reduce the time and computational resources used in generating the response output 118(1) using the response module 114 and response data 116. Other request inputs 110 of the request 106(2) that do not match request inputs 110 of the data structure 102(1) may be used to generate other response outputs 118 to be included in the response 104(2) based on the response data 116. For example, the response module 114 may generate a third response output 118(3) based on the third request input 110(3) and the response data 116.

In some implementations, if an expiration time or count of uses is associated with a particular request input 110, response output 118, or with the data structure 102(1), the input reuse module 130 may determine that the expiration time or count of uses has not occurred prior to generating the reuse determination 132. Additionally, in some cases, if the expiration time or count of uses has occurred, the reuse module 130 or another module associated with the server(s) 112 may modify the data structure 102(1), such as by removing a request input 110 or response output 118 associated with the data structure 102(1), deleting the data structure 102(1), or providing an instruction to the client device 108 to cause the client device 108 to modify or delete the data structure 102(1).

In some implementations, if a response output 118 from the data structure 102(1) is used to generate a portion of the response 104(2), the response 104(2) may be provided to the client device 108 without performing additional processes. However, in other implementations, the input analysis module 120 may analyze the second request 106(2) based on the service data 122 to determine particular request inputs 110 of the second request 106(2) that are associated with multiple requests 106. For example, between the first time T1 and the second time T2, the service data 122 or other data regarding the client device 108, request 106(2), or services executing on the client device 108 may have changed such that the first request input 110(1) is no longer associated with multiple requests 106. As another example, as shown in FIG. 1B, the third request input 110(3) that was not received by the server(s) 112 at the first time may be associated with multiple requests 106. Continuing the example, FIG. 1B depicts the input analysis module 120 generating an input determination 124(2) indicating that the first request input 110(1) and the third request input 110(3) are associated with multiple requests 106.

Based on the input determination 124(2), the memoization module 126 may generate a second data structure 102(2) to replace the previous data structure 102(1), or modify the previous data structure 102(1) to form the second data structure 102(2), such as by adding an indication of the third request input 110(3) and response output 118(3). The output module 128 may then provide the second response 104(2) and the second data structure 102(2) to the client device 108. When the client device 108 provides a subsequent request 106 to the server(s) 112, the data structure 102(2) may be provided with the request 106, and the process described with regard to FIG. 1B may be repeated. For example, when request inputs 110 that match those of the data structure 102(2) the corresponding response outputs 118 from the data structure 102(2) may be used, while for other request inputs 110 the response module 114 may generate additional response outputs 118 based on the response data 116. If the input analysis module 120 determines that the request inputs 110 that are associated with multiple requests 106 have changed, the memoization module 126 may generate a new data structure 102 to be provided to the client device 108 with the response 104. In other implementations, a data structure 102 may be generated based on an input determination 124 for each request 106 regardless of whether the request inputs 110 of the input determination 124 have changed since a previous request 106 was received.

Figure 2:
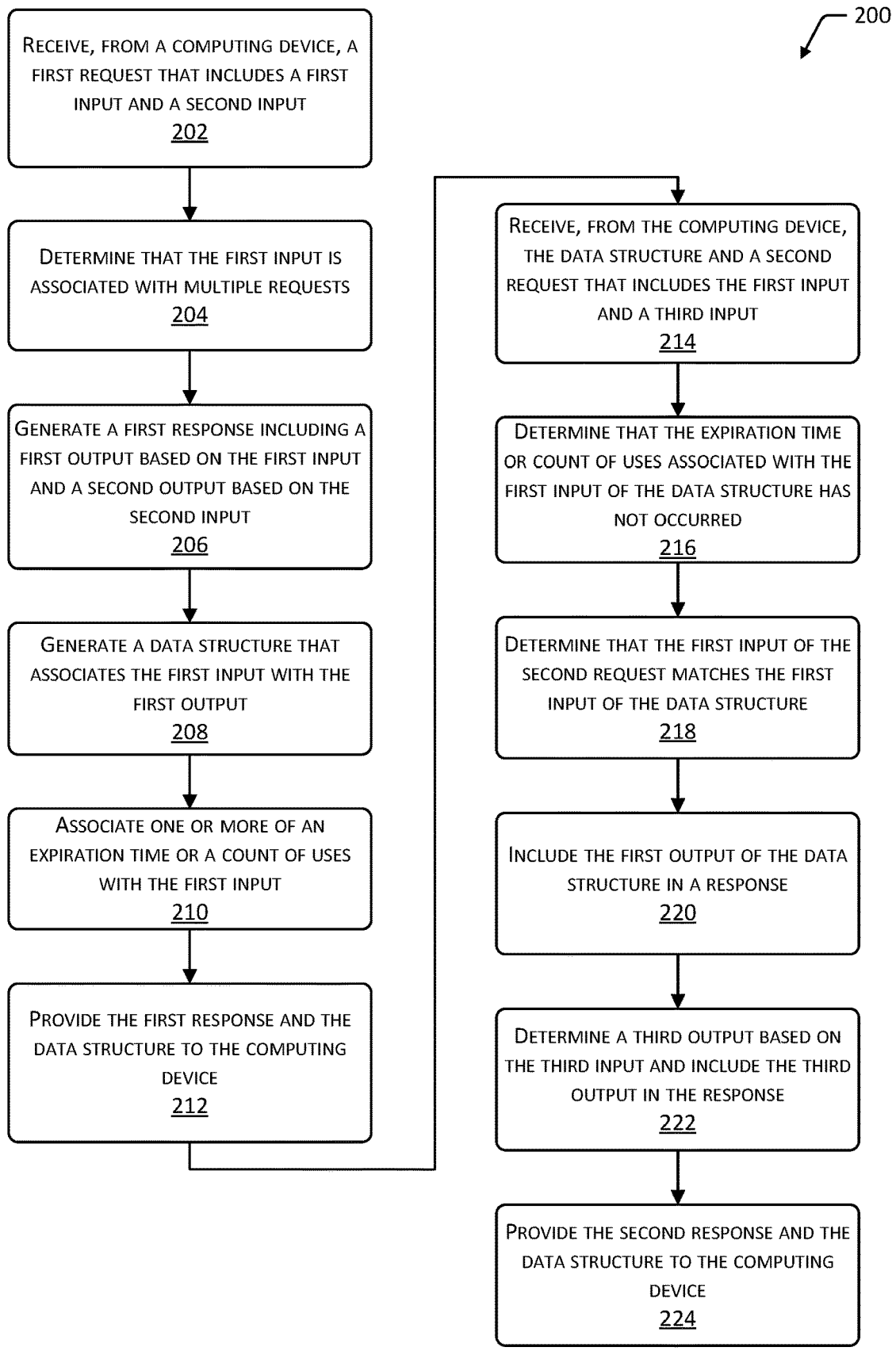
FIG. 2 is a flow diagram depicting an implementation of a method for generating a data structure based on a first request and using the data structure to generate a response to a second request.

FIG. 2 is a flow diagram 200 depicting an implementation of a method for generating a data structure 102 based on a first request 106(1) and using the data structure 102 to generate a response 104 to a second request 106(2). At 202, a first request 106(1) may be received from a computing device. The first request 106(1) may include a first input and a second input. For example, as described with regard to FIG. 1A, a request 106 may include any number of request inputs 110. A client device 108 or another type of computing device may provide the first request 106(1) to one or more servers 112 that may generate a response 104 and a data structure 102 based at least in part on one or more of the request inputs 110.

At 204, it may be determined that the first input is associated with multiple requests 106. For example, particular request inputs 110 may be associated with reuse with multiple requests 106, such as when a series of similar requests 106 are provided to the server(s) 112 as part of an iterative process. In some implementations, service data 122 may indicate particular request inputs 110 that are associated with multiple requests 106, or may indicate characteristics of the requesting device, the request 106(1), or a service providing the request from which such request inputs 110 may be determined. Service data 122 may be stored in the server(s) 112 or other computing device(s) that receive the request 106(1). In other cases, service data 122 may be provided by the requesting device, such as concurrent with the request 106(1).

At 206, a first response 104(1) may be generated based on the first request 106(1). The first response 104(1) may include a first output based on the first input and a second output based on the second input. As described with regard to FIG. 1A, response data 116 may associate request inputs 110 with corresponding response outputs 118. In some cases, determining a response output 118 may include performing a calculation or computational task based on one or multiple request inputs 110. In other cases, multiple response outputs 118 may be generated based on a single request input 110 or set of request inputs 110. A response module 114 associated with the server(s) 112 that receive the request 106(1) may generate a response 104(1) based on the request 106(1), the device providing the request, and so forth.

At 208, a data structure 102 may be generated that associates the first input with the first output. For example, in response to the determination that the first input is associated with multiple requests 106 at 204, a data structure 102 may be generated that includes the first input. The first output that is determined based on the first input at 206, may be stored in the data structure 102 in association with the first input. While FIG. 2 describes an example implementation in which a single input is stored in the data structure 102, any number of inputs that are determined to be associated with multiple requests 106 may be stored, in association with corresponding outputs, in the data structure 102. In other implementations, inputs and corresponding outputs may be stored in a data structure 102 independent of whether the inputs are associated with multiple requests 106. For example, every input associated with a request 106 may be stored in a data structure 102. In such a case, if subsequent inputs from subsequent requests 106 match any of the stored inputs, the corresponding outputs may be used in a response 104, while other outputs may be determined subsequent inputs that do not match any of the stored inputs.

At 210, one or more of an expiration time or a count of uses may be associated with the first input. For example, at a subsequent time, the output that is determined based on the first input may change. In such a case, if the first output stored in the data structure 102 is used continuously, future responses 104 may include incorrect data. Use of an expiration time or count of uses may cause the first input, first output, or data structure 102 to expire. For example, upon occurrence of the expiration time or count of uses, the first input, first output, or data structure 102 may be deleted, or may be retained but prevented from use. An expiration time may include a specific time at which a data structure 102 or input will no longer be valid or a length of time subsequent to creation of the data structure 102 or addition of an input to the data structure 102. A count of uses may include a count of requests 106 received by the server(s) 112 or a count of times when a response 104 is generated based in part on the data structure 102. In other implementations, an expiration time or count of uses may not be associated with the first input or with the data structure 102, and block 210 may be omitted. For example, a particular input or a data structure 102 may be invalidated in response to receipt of a subsequent request 106 having a request input 110 that does not match one or more of the inputs in the data structure 102 instead of or in addition to use of an expiration time or count of uses.

At 212, the first response 104(1) and the data structure 102 may be provided to the computing device that provided the first request 106(1). As described previously, storage of the data structure 102 in association with the requesting computing device may prevent consumption of data storage on the server(s) 112 or other computing devices used to generate responses 104.

At 214, a second request 106(2) may be received from the computing device. The computing device may also provide the data structure 102. The second request 106(2) may include one or more inputs, such as the first input and a third input. In some cases, one or more inputs of the second request 106(2) may be common to one or more inputs of the previous request 106(1), such as the first input, while other inputs may not be common to previous requests 106(1), such as the third input.

At 216, a determination may be made that the expiration time or count of uses associated with the first input of the data structure 102 has not occurred. Due to the non-occurrence of the expiration time or the count of uses, the inputs of the second request 106(2) may be compared to those of the data structure 102 to determine whether one or more outputs stored in the data structure 102 may be used in a subsequent response 104(2).

As such, at 218, a determination may be made that the first input of the second request 106(2) matches the first input of the data structure 102. Based on this determination, at 220, the first output of the data structure 102, which is associated with the first input, may be included in a response 104(2) to the second request 106(2). Use of a previously-generated output that is stored in the data structure 102 may prevent the use of time and computational resources that would otherwise be used to generate the first output based on the first input. In cases where inputs of the second request 106(2) do not match inputs of the data structure 102, outputs of the data structure 102 may not be included in the response 104(2) and instead, an output may be generated in response to the request 106(2). In some implementations, the data structure 102 may be analyzed to determine that it has not been modified prior to receipt of the data structure 102 from the computing device. If the data structure 102 has been modified, outputs may be generated in response to the request 106(2) without using the data in the data structure 102.

At 222, a third output may be determined based on the third input and included in the response 104(2). For example, because the third input is not included in the data structure 102, the third input of the second request 106(2) would not match any inputs of the data structure 102. In such a case, an output may be generated based on the third input, such as by a response module 114 accessing response data 116, as described with regard to FIGS. 1A and 1B.

At 224, the second response 104(2) and the data structure 102 may be provided to the computing device that provided the second request 106(2). In some implementations, if no additional inputs are determined to be associated with multiple requests 106, and if the occurrence of an expiration time or count of uses for an input in the data structure 102 is not determined, the data structure 102 may be provided to the requesting device without modifying the data structure 102. In other implementations, if the data structure 102 is not modified, the response 104(2) may be provided to the requesting device without the data structure 102 due to the current version of the data structure 102 being stored on the requesting device.

Figure 3:
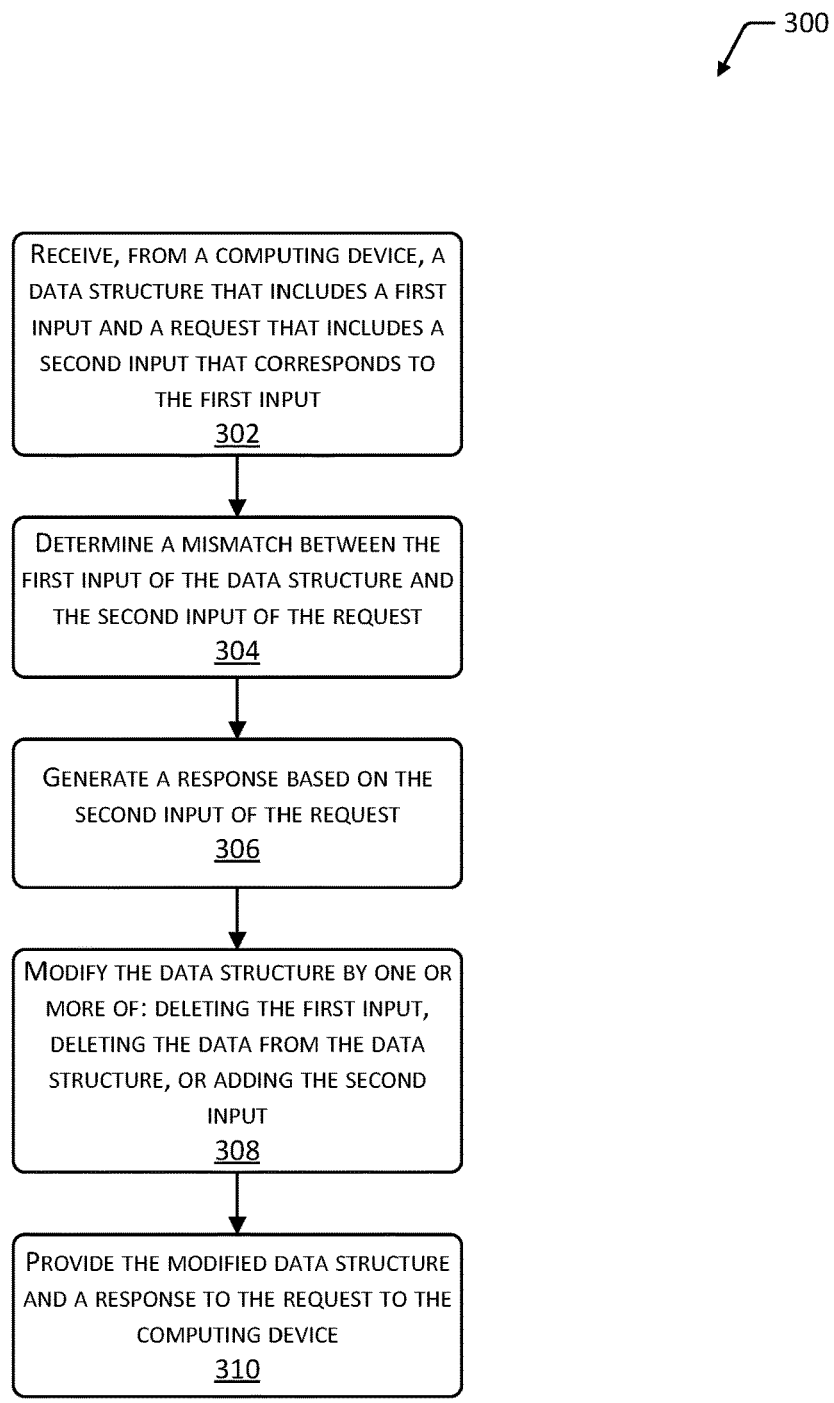
FIG. 3 is a flow diagram depicting an implementation of a method for modifying a data structure based on subsequent requests received from a computing device.

FIG. 3 is a flow diagram 300 depicting an implementation of a method for modifying a data structure 102 based on subsequent requests 106 received from a computing device. At 302, a data structure 102(1) may be received from a computing device. The data structure 102(1) may include a first input. A request 106 may also be received from the computing device. The request 106 may include a second input that corresponds to the first input. For example, the second input may include a request input 110 that is mutually exclusive with the first input, such as a field or value for a database or another type of value, category, or operator that performs the same or a mutually exclusive function as the first input. In other cases, the request 106 may include an indication that the second input is intended to replace the first input included in previous requests 106. For example, the second input may include a modified version of the first input.

At 304, a mismatch may be determined between the first input of the data structure 102(1) and the second input of the request 106. For example, because the second input differs from the first input, no inputs of the request 106 may match the first input of the data structure 102(1).

At 306, a response 104 may be generated based on the second input of the request 106. For example, due to the mismatch between the second input of the request 106 and the data structure 102, a response may be generated by determining an output based on the second input and response data 116, as described with regard to FIGS. 1A and 1B.

At 308, the data structure 102(1) may be modified. Modification of the data structure 102(1) may include one or more of deleting the first input from the data structure 102(1), deleting the data from the data structure 102(1) (e.g., emptying the data structure 102(1)), or adding the second input to the data structure 102(1). In other implementations, the first input or the data structure 102(1) may be designated for non-use without deleting the data structure 102(1) or the first input. Modification of the initial data structure 102(1) may form a modified data structure 102(2).

At 310, the modified data structure 102(2) may be provided to the computing device that provided the request 106. A response 104 to the request 106 may also be provided to the computing device. The modified data structure 102(2) may replace previous versions of the data structure 102(1) stored on the computing device.

Figure 4:
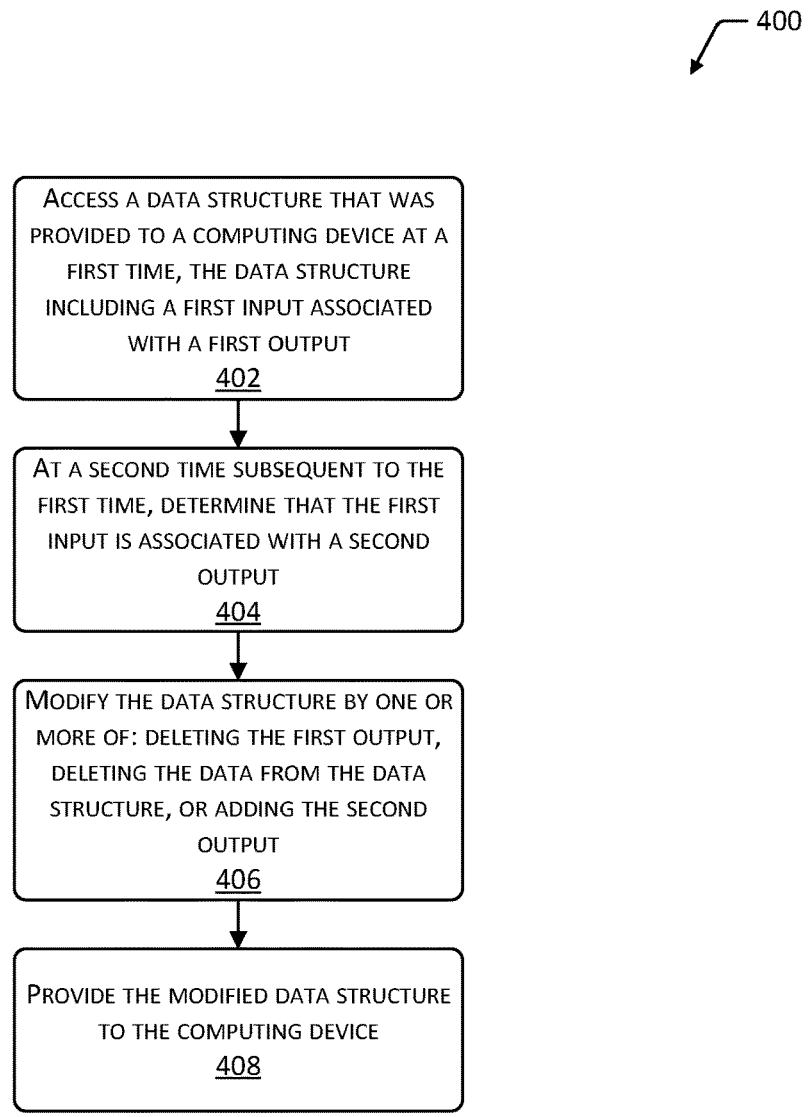
FIG. 4 is a flow diagram illustrating an implementation of a method for modifying a data structure based on changes to outputs that are stored in the data structure.

FIG. 4 is a flow diagram 400 illustrating an implementation of a method for modifying a data structure 102(1) based on changes to outputs that are stored in the data structure 102(1). At 402, a data structure 102(1) that was provided to a computing device at a first time may be accessed. The data structure 102(1) may include a first input associated with a first output. For example, as described with regard to FIG. 1A, a request input 110 that is associated with multiple requests 106 may be stored in a data structure 102(1) in association with a response output 118 that corresponds to the request input 110. At a subsequent time, if a request 106 that includes a matching request input 110 is received, the response output 118 from the data structure 102 may be included in a response 104 rather than recomputing a response output 118 based on the received request 106.

At 404, at a second time subsequent to the first time, it may be determined that the first input is associated with a second output. For example, at the first time, a response module 114 may determine a first response output 118(1) based on a request input 110 and response data 116. After the first response output 118(1) has been determined and stored in a data structure 102(1) in association with the request input 110, the response data 116 or other rules, algorithms, computational processes, or data associated with generation of response outputs 118 may be changed. As such, at the second time subsequent to the first time, a different response output 118(2) may be determined based on the request input 110. In such a case, a data structure 102(1) may include a response output 118(1) that differs from the response output 118(2) that would currently be determined if the associated request input 110 were used to determine an output. Data structures 102 may be periodically accessed to determine the accuracy of the response outputs 118 stored therein, such as at a time when a data structure 102 is received from a computing device.

At 406, the data structure 102(1) may be modified by one or more of deleting the first output from the data structure 102(1), deleting the data from the data structure 102(1), or adding the second output to the data structure 102(1). Modification of the initial data structure 102(1) may result in generation of a modified data structure 102(2). At 408, the modified data structure 102(2) may be provided to the computing device associated with the initial data structure 102(1). In other implementations, an instruction may be provided to the computing device to cause the computing device to modify the data structure 102(1), such as by adding, removing, or replacing inputs or outputs, or by deleting the data structure 102(1).

Figure 5:
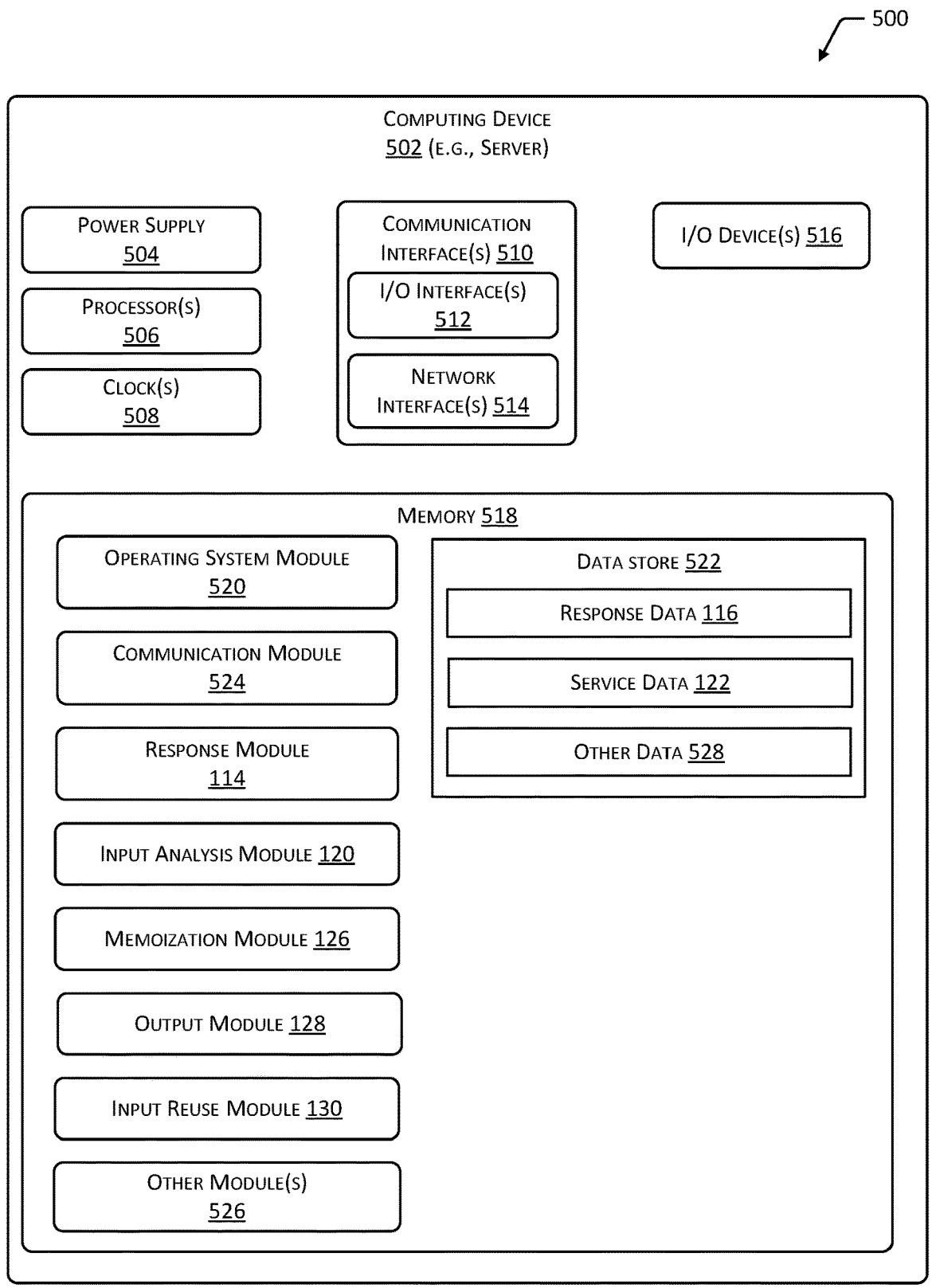
FIG. 5 is a block diagram depicting an implementation of a computing device for generating responses and data structures, such as one or more servers, within the present disclosure.

FIG. 5 is a block diagram 500 depicting an implementation of a computing device 502 for generating responses 104 and data structures 102, such as one or more servers 112, within the present disclosure. The computing device 502 may include one or more servers 112 or other computing devices 502 in communication with the server(s) 112. As such, while FIG. 5 depicts a single block diagram 500 of a computing device 502, any number and any type of computing devices 502 may be used to perform the functions described herein. While FIG. 5 depicts an example implementation of a server 112, in some cases, all or a portion of the functions described herein with regard to the server(s) 112 may be performed by one or more client devices 108, and all or a portion of the functions described with regard to the client device 108 may be performed by one or more servers 112. Additionally, any functions described herein may be performed by one or more other computing devices 502 in communication with a client device 108 or a server 112.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, LTE, and so forth.

The computing device 502 may include one or more busses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices 502, network attached storage devices, and so forth.

A communication module 524 may be configured to establish communications with one or more other computing devices 502. Communications may be authenticated, encrypted, and so forth.

The memory 518 may also store the response module 114. The response module 114 may generate responses 104 based on received requests 106. For example, the response module 114 may access response data 116 that associates particular request inputs 110 with corresponding response outputs 118. In some cases, the response module 114 may access one or more rules, algorithms, or other sources of data that cause performance of one or more computational processes to determine response outputs 118 based on request inputs 110. For example, the response module 114 may perform various calculations to determine a response output 118 or group of response outputs 118 based on a single request input 110 or multiple request inputs 110.

The memory 518 may additionally store the input analysis module 120. The input analysis module 120 may determine particular request inputs 110 that are associated with multiple requests 106. For example, the input analysis module 120 may access service data 122 that indicates particular request inputs 110 that are used in multiple requests 106, data regarding a computing device 502 providing the requests 106, a user account associated with the requests 106, a service associated with the requests 106, and so forth. In some implementations, the input analysis module 120 may determine request inputs 110 that are not associated with multiple requests 106 in addition to or in place of determining request inputs 110 associated with multiple requests 106. In some cases, the input analysis module 120 may utilize one or more machine learning algorithms or other types of processes to analyze multiple requests 106 and determine particular request inputs 110 that recur in at least a threshold portion (e.g., a threshold count or threshold percentage) of requests 106. In other implementations, all request inputs 110 that are received or each request input 110 that includes certain characteristics may be stored independent of the service data 122 or an indication that the request inputs 110 are associated with multiple requests 106, and use of the input analysis module 120 may be omitted.

The memory 518 may store the memoization module 126. The memoization module 126 may generate data structures 102 based on request inputs 110 determined by the input analysis module 120 or by other rules or algorithms that result in storage of the request inputs 110. The memoization module 126 may determine the response output 118 associated with each request input 110 to be stored, either independently or based on the response 104 generated by the response module 114, and may store each request input 110 in association with a corresponding response output 118. In some implementations, the memoization module 126 may associate an expiration time or a count of uses with a request input 110, a response output 118, or a data structure 102. While a server 112 or other type of computing device 502 may generate one or more data structures 102, as described previously, the computing device 502 may not store the data structure(s) 102. Instead, a data structure 102 may be provided to a client device 108, such as concurrent with a response 104, and the client device 108 may store the data structure 102. The client device 108 may then provide the data structure 102 to the computing device 502 at a subsequent time, such as concurrent with a subsequent request 106.

The memory 518 may also store the output module 128. The output module 128 may generate an output that includes one or more responses 104 and data structures 102, which may be provided to another computing device 502. For example, in response to a request 106 received from another computing device 502, an output may be provided that includes a response 104 to the request 106 and a data structure 102 that includes the request inputs 110 and corresponding response outputs 118 for each request input 110 associated with multiple requests 106.

The memory 518 may additionally store the input reuse module 130. The input reuse module 130 may determine correspondence between the request inputs 110 of a data structure 102 received in association with a request 106 and the request inputs 110 of the request 106. For each request input 110 of a request 106 that matches a request input 110 of the data structure 102, the corresponding response output 118 of the data structure 102 may be used in a response 104. For each request input 110 of the request 106 that does not match a request input 110 of the data structure 102, a response output 118 may be generated by the response module 114 based on the response data 116 and included in the response 104.

Other modules 526 may also be present in the memory 518. For example, other modules 526 may include modules for identifying characteristics of computing devices 502 that provide requests 106, encryption modules to encrypt and decrypt communications between computing devices 502, authentication modules to authenticate communications sent or received by computing devices 502, a permission module to assign, determine, and manage user permissions to access or modify data associated with computing devices 502, such as expiration times associated with request inputs 110 and data structures 102, and so forth.

Other data 528 within the data store(s) 522 may include configurations, settings, preferences, and default values associated with computing devices 502. Other data 528 may also include encryption keys and schema, access credentials, and so forth. Other data 528 may also include network data indicative of networks and other computing devices 502 accessible to one or more computing devices 502. Other data 528 may include expiration times associated with storage of data structures 102 and request inputs 110.

In different implementations, different computing devices 502 may have different capabilities or capacities. For example, servers 112 may have greater processing capabilities or data storage capacity than client devices 108.

Figure 6:
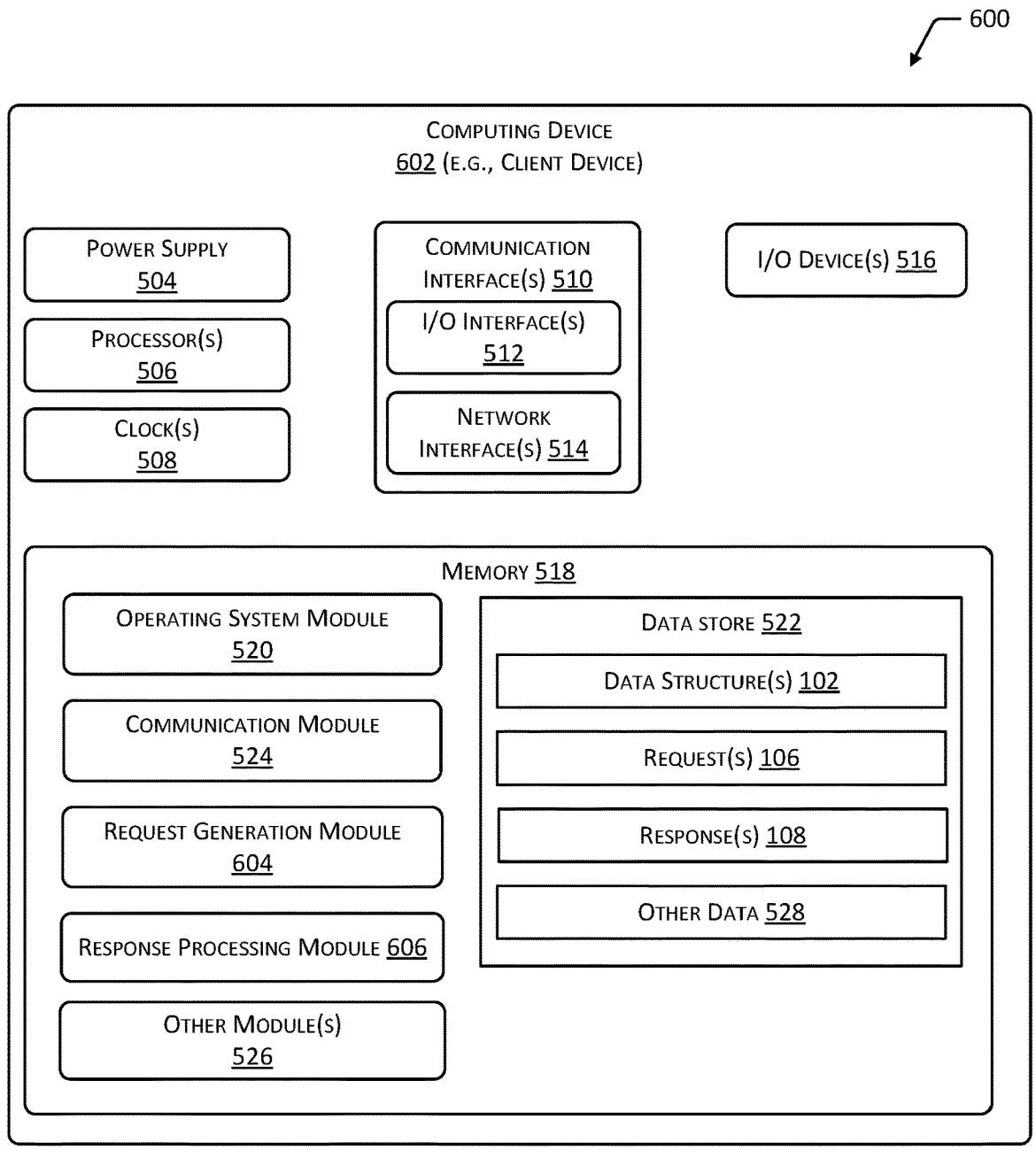
FIG. 6 is a block diagram depicting an implementation of a computing device for generating requests and receiving responses and data structures, such as a client device, within the present disclosure.

FIG. 6 is a block diagram 600 depicting an implementation of a computing device 602 for generating requests 106 and receiving responses 104 and data structures 102, such as a client device 108, within the present disclosure. The power supply 504, processor(s) 506, clock(s) 508, communication interface(s) 510, I/O device(s) 516, memory 518, OS module 520, data store 522, communication module 524, other module(s) 526, and other data 528 associated with the computing device 602, shown in FIG. 6, may be of the same or similar type as those described with regard to the computing device 502 of FIG. 5. Additionally, while FIG. 6 depicts a single block diagram 600 of a computing device 602, any number and any type of computing devices 602 may be used to perform the functions described herein.

The memory 518 of the computing device 602 may store a request generation module 604. The request generation module 604 may generate requests 106 that include one or more request inputs 110, which may be provided to other computing devices 602, such as one or more servers 112. In some implementations, requests 106 may be generated based on user input. In other implementations, requests 106 may be generated at least in part automatically, such as using one or more services executing on the computing device 602. In addition to generating requests 106, the request generation module 604 may be configured to transmit the data structure(s) 102 that were previously received from another device to the device that receives the request 106. For example, the data structure 102 may be transmitted concurrently with a request 106. In other implementations, the data structure 102 may be transmitted prior to or subsequent to transmission of the request 106. Storage of the data structure 102 in the data store 522 of the computing device 602 may eliminate the need to store the data structure 102 in association with another device, such as a server 112 that receives the request 106.

The memory 518 of the computing device 602 may also store a response processing module 606. The response processing module 606 may receive responses 104 from other devices, such as from one or more servers 112 and may generate output based on the responses 104, store the responses 104 or data indicative of the responses, and so forth. The response processing module 606 may also be configured to receive data structures 102 concurrent with, prior to, or subsequent to receiving a response 104. The response processing module 606 may store the data structure(s) 102 in the data store 522, such that the data structure(s) 102 may be transmitted in conjunction with a subsequent request 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive, at a first time, a first request from a computing device executing a service, wherein the first request includes a first input and a second input;
determine, based on first data associated with the service, that the first input is associated with multiple requests;
determine a first output based on the first input;
determine a second output based on the second input;
in response to the first request, generate a first response that includes the first output and the second output;
in response to determining that the first input is associated with multiple requests, generate a data structure that associates the first input with the first output;
provide the first response and the data structure to the computing device;
receive, at a second time subsequent to the first time, a second request and the data structure from the computing device, wherein the second request includes the first input and a third input;
determine that the first input of the second request matches the first input from the data structure;
in response to the first input of the second request matching the first input from the data structure, determine the first output from the data structure;
determine a third output based on the third input;
generate a second response that includes the first output from the data structure and the third output; and
provide the second response and the data structure to the computing device.

2. The system of claim 1, wherein the first request further includes a fourth input and the second request further includes a fifth input that corresponds to the fourth input, the system further comprising computer-executable instructions to:

determine, based on the data associated with the service, that the fourth input is associated with multiple requests;

determine a fourth output based on the fourth input;

include the fourth output in the first response;

include the fourth input associated with the fourth output in the data structure;

determine a mismatch between the fifth input of the second request and the fourth input of the data structure;

in response to the mismatch, determine a fifth output based on the fifth input of the second request;

remove the fourth input and the fourth output from the data structure;

add the fifth input of the second request and the fifth output to the data structure; and include the fifth output in the second response.

3. The system of claim 1, further comprising computer-executable instructions to:

at a third time subsequent to the second time, determine that the data structure includes the first input;

determine a fourth output based on the first input;

determine a mismatch between the first output of the data structure and the fourth output; and cause the computing device to one or more of: remove the first input and first output from the data structure, delete second data from the data structure, or add the first input associated with the fourth output to the data structure.

4. A method comprising:

generating, at a first time, a data structure that associates a first input with a first output;

providing the data structure to a computing device;

receiving from the computing device, at a second time subsequent to the first time, the data structure and a first request, wherein the first request includes the first input and a second input;

determining that the first input of the data structure matches the first input of the first request;

in response to the first input of the data structure matching the first input of the first request, including the first output in a first response;

determining a second output based on the second input;

including the second output in the first response; and providing the first response to the computing device.

5. The method of claim 4, further comprising:

receiving from the computing device, at a third time prior to the first time, a second request that includes the first input and a third input;

determining the first output based on the first input;

determining a third output based on the third input; and providing, with the data structure, a second response that includes the first output and the third output to the computing device.

6. The method of claim 5, further comprising:

determining, based on data associated with one or more of the computing device, the second request, or a service executing on the computing device, that the first input is associated with multiple requests, wherein the first input is included in the data structure in response to the data associated with the one or more of the computing device, the second request, or the service.

7. The method of claim 4, further comprising:

receiving, from the computing device, at a third time subsequent to the second time, the data structure and a second request, wherein the second request includes a third input and a fourth input that corresponds to the first input;

determining a third output based on the third input;

determining a mismatch between the second request and the first input of the data structure;

in response to the mismatch, determining a fourth output based on the fourth input; and generating a second response that includes the third output and the fourth output.

8. The method of claim 7, further comprising one or more of:

adding the fourth input and the fourth output to the data structure; or in response to the mismatch, removing the first input and the first output from the data structure.

9. The method of claim 4, further comprising:

at a third time subsequent to the second time, determining a third output based on the first input;

determining a mismatch between the first output of the data structure and the third output; and causing the computing device to one or more of: remove the first input and the first output from the data structure, delete data from the data structure, or add the first input associated with the third output to the data structure.

10. The method of claim 4, further comprising:

receiving from the computing device, prior to the first time, a plurality of requests, wherein at least a threshold portion of the plurality of requests includes the first input; and in response to the at least a threshold portion of the plurality of requests including the first input, including the first input in the data structure.

11. The method of claim 4, further comprising:

receiving from the computing device, at a third time subsequent to the second time, the data structure and a second request that includes the first input and a third input;

determining a mismatch between the data structure received from the computing device at the third time and the data structure provided to the computing device at the first time;

in response to the mismatch, determining the first output based on the first input of the second request and a third output based on the third input;

generating a second data structure that associates the first input with the first output; and providing the second data structure to the computing device.

12. The method of claim 4, further comprising:

at the first time, associating an expiration time with one or more of: the data structure or the first input of the data structure; and subsequent to receiving the first request, determining a lack of occurrence of the expiration time, wherein the first output from the data structure is included in the first response in response to the lack of occurrence of the expiration time.

13. A system comprising:

one or more memories storing computer-executable instructions; and one or more hardware processors to execute the computer-executable instructions to:

receive, at a first time from a computing device:
   a data structure that associates a first input with a first output; and
   a first request that includes at least the first input;
determine that the first input of the first request matches the first input of the data structure;
in response to the first input of the first request matching the first input of the data structure, include the first output of the data structure in a first response; and
provide the first response and the data structure to the computing device.

14. The system of claim 13, further comprising computer-executable instructions to:
   at a second time prior to the first time, receive from the computing device a second request that includes the first input;
   determine the first output based on the first input;
   generate the data structure that associates the first input with the first output; and
   provide the data structure to the computing device.

15. The system of claim 14, further comprising computer-executable instructions to:
   determine, based on data associated with one or more of the computing device, the second request, or a service executing on the computing device, that the first input is associated with multiple requests, wherein the first input is included in the data structure in response to the data associated with the one or more of the computing device, the second request, or the service.

16. The system of claim 13, further comprising computer-executable instructions to:
   generate, before the first time, the data structure that associates the first input with the first output; and
   provide, before the first time, the data structure to the computing device.

17. The system of claim 13, wherein the first request further includes a second input, the system further comprising computer-executable instructions to:
   determine, based on data associated with one or more of the computing device, the first request, or a service executing on the computing device, that the second input is associated with multiple requests;
   determine a second output based on the second input;
   include the second output in the first response; and
   add the second input and the second output to the data structure.

18. The system of claim 13, wherein the first request further includes a second input, the system further comprising computer-executable instructions to:
   determine, based on data associated with one or more of the computing device, the first request, or a service executing on the computing device, that the second input is not associated with multiple requests;
   determine a second output based on the second input; and
   include the second output in the first response, wherein the data structure provided to the computing device lacks the second input and the second output.

19. The system of claim 13, further comprising computer-executable instructions to:
   receive from the computing device, at a second time subsequent to the first time, a second request that includes a second input and a third input that corresponds to the first input;
   determine a second output based on the second input;
   determine a mismatch between the third input of the second request and the first input of the data structure;
   in response to the mismatch, determine a third output based on the third input; and
   include the third output in the first response.

20. The system of claim 19, further comprising computer-executable instructions to one or more of:
   add the third input and the third output to the data structure; or
   delete the first input and the first output from the data structure.

* * * * *